United States Patent

[11] 3,541,905

| [72] | Inventor | Helmut Mey<br>Sursee, Switzerland |
| --- | --- | --- |
| [21] | Appl. No. | 742,815 |
| [22] | Filed | July 5, 1968 |
| [45] | Patented | Nov. 24, 1970 |
| [73] | Assignee | Contec Ltd.<br>Sursee, Switzerland<br>a corporation of Switzerland |
| [32] | Priority | July 14, 1967 |
| [33] | | Germany |
| [31] | | No. C42,876 |

[54] CUTTING APPARATUS AND METHOD
7 Claims, 1 Drawing Fig.

[52] U.S. Cl.................................................. 82/47, 82/101

[51] Int. Cl.................................................. B23b 3/04, B23b 5/14
[50] Field of Search............................................ 82/46, 47, 101, 102, 70.1

[56] References Cited
UNITED STATES PATENTS

| 3,084,578 | 4/1963 | Hartford...................... | 82/101X |
| --- | --- | --- | --- |
| 3,292,468 | 12/1966 | Orthey........................ | 82/101 |

*Primary Examiner*—Harrison L. Hinson
*Attorney*—Seidel & Gonda

ABSTRACT: Tubular workpieces are cut radially into rings by a rotating blade. The workpiece may be stationary or rotated about its longitudinal axis by an endless belt contacting at least 180° of the periphery of the workpiece.

Patented Nov. 24, 1970
3,541,905
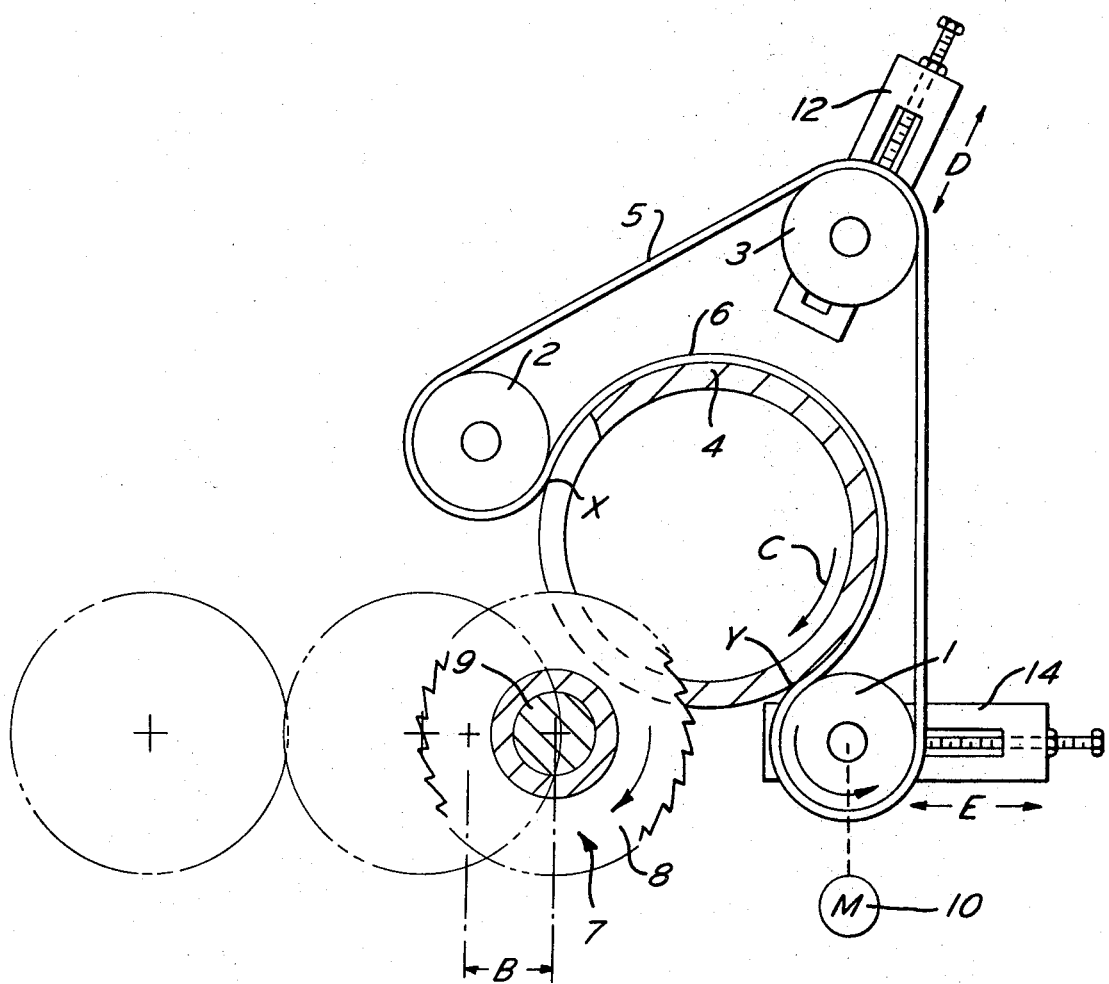
INVENTOR
HELMUT MEY
BY
Seidel & Gonda
ATTORNEYS.

CUTTING APPARATUS AND METHOD

The invention relates to apparatus and process for the radial cutting into pieces of tubular workpieces, to thereby produce articles such as piston ring or cylinder liner blanks. The workpiece is cut while in the clamped condition and employing a relative movement between the workpiece and the cutting tool. The cutting action is in the radial direction at right angles to the axis of rotation.

Various modes of operation and devices for the cutting up of annular or sleeve-shaped workpieces, such as piston ring or cylinder liner blanks, are known. When cutting such blanks, in particular piston ring blanks, special requirements have to be satisfied with regard to the clamping and guiding of the workpiece. The blanks cannot be laterally clamped (at least not without special precautions being taken) since otherwise the sawblades and the rings would become jammed together on completion of the cut. The blanks cannot be externally clamped (or at least they cannot be so clamped without special precautions being taken), since the cutting tool is required to reach the entire periphery during the cutting procedure. Thus, normally internal clamping tools are used.

In conventional design, such internal clamping tools comprise a cylindrical steel mandrel surrounded by an outer member made of a resilient material such as rubber or a suitable synthetic material. The rubber or synthetic material is, after a stack of blanks has been pushed over it, axially compressed so that it expands radially and clamps the blanks fitted on it. This method has a multiplicity of disadvantages. It is not possible for the cutting tools to penetrate beyond the inner periphery of the blanks by more than 1 or 2 mm. Further, due to inaccuracies in the shape of the blanks, with every working cycle annular grooves are cut into the rubber member. On each subsequent working cycle, these grooves are, when clamping is effected, again partially closed by pressure in consequence of the resilience of the rubber and, during the subsequent separation, they are once again cut. Thus, the rubber or other synthetic material is continuously cut and the result is rapid wear of the resilient material. The frequent changing of the resilient material which is necessary constitutes an additional working step and the consumption of such clamping elements is so considerable that it very noticeably adds to the costs of the process.

A further disadvantage of radial inner clamping consists in that the rings are subjected to considerable stressing. In combination with the cutting forces, such tensile stressing sometimes results in the rupture of a ring. The fragments may then become wedged between the sawblades, which are only approximately 1 mm. thick, and in this way cause damage to them or even rupture them.

Further more, the elimination of a ring enables the rubber member to deflect into the gap thus formed, so that the radial pressure on the adjacent rings, and therewith the clamping forces are diminished. The rings may then slip and this also frequently results in the rupture of sawblades.

Finally, it should also be mentioned that the rings are naturally not rigidly retained by the rubber member. The entire system comprising the rubber member and applied rings is subject to vibration. In this way, the accuracy of cut and service life of the tools are impaired.

Attempts have been made to replace the rubber member by a plurality of mechanically or hydraulically actuated claws. However, such devices are extremely subject to wear and are not sufficiently reliable in operation. For this reason, they have not been generally adopted.

The invention is based on the problem of how to provide a process and a device for the radial cutting up of annular or sleeve-shaped workpieces. This is accomplished by a process and device which do not have the above-mentioned and similar disadvantages of the known processes and devices. This invention requires no arrangement and no replacement of internal clamping elements. This invention permits the securing and movement of the workpiece or workpieces with the aid of simple means and enables workpieces of varying diameter to be machined.

According to the invention, an endless band or belt which is guided in a special manner is used both for the clamping of the workpiece or workpieces to be cut and also for transmitting the movement required for the cutting process to the workpiece or workpieces.

According to the invention, a process is provided for the radial cutting into pieces of annular or sleeve-shaped workpieces, such as piston ring or cylinder liner blanks, wherein the workpiece is, in the clamped condition and employing a relative movement between the workpiece and the cutting tool. The workpiece is cut in a radial direction at right angles to the axis of rotation. The said process being characterized in that the workpiece is inserted in a loop, which is somewhat more than semicircular, of an endless band or belt. The said endless belt is firmly tensioned against the portion of the outer periphery of the workpiece remote from the engagement zone of the cutting tool, and the workpiece is, by means of the endless belt, both pressed with the desired force against the cutting tool and also rotated about its longitudinal axis.

In an advantageous form of carrying the invention into effect, the workpiece clamped in the loop of the endless belt is first of all retained without rotation thereof and the cutting tool is slowly fed forwardly in proportion with the cutting capacity until the cutting edge of the cutting tool has penetrated into the interior space of the workpiece. Thereafter, the workpiece is slowly rotated by means of the endless belt, in proportion with the cutting capacity and, thereby, the cutting point in the workpiece is advanced towards the cutting edge. In this case, therefore, the workpiece is first of all completely cut through over a limited sector of the periphery and then the cutting point is slowly advanced by the amount of the full circumference of the workpiece. Such advance is accomplished by the workpiece being slowly rotated towards the cutting edge of the cutting tool.

In the case of a further advantageous form of embodiment, the workpiece clamped in the loop of the endless belt is rapidly rotated by means of the said belt and the cutting tool is advanced slowly into contact with the workpiece, in proportion with the cutting capacity. In this case, the cutting edge of the cutting tool engages tangentially on the workpiece and the cut is always effected over the entire periphery, until the cutting edge penetrates into the inner space of the workpiece.

With the process of the invention it is of course possible also to cut a plurality of workpieces simultaneously, i.e., to simultaneously effect a multiplicity of cuts. A typical example is the simultaneous machining of piston ring blanks (for example, 10 to 20 piston ring blanks required to be halved), which are arranged in a stack, using a set of 10 to 20 cutting tools with appropriate intermediate or spacer discs for adjusting the desired spacing.

In order to guarantee especially uniform penetration of the cutting edges of the cutting tools into the workpiece, the stack may be axially clamped during the initial phase of the cutting process since, in this phase, i.e., for as long as the main zone of the rings has not yet been severed, the cutting step is not impaired by pressure in the axial direction. With this embodiment of the process, therefore, a plurality of workpieces is secured parallel to each other in the loop of the endless belt, the stack formed is axially clamped during the initial phase of the cutting step and the individual workpieces of the stack are simultaneously cut through using a set of parallel cutting blades.

The invention provides furthermore a device for the carrying into effect of the above-discussed process, the said device being characterized in that a plurality of clamping and deflecting rolls are provided. At least one roll is connected with a drive and at least one roll is adjustable relatively to the adjacent rolls with a spacing within the range of the diameters of the workpieces to be cut. The rolls are arranged in the form of a polygon surrounding the workpiece. An endless belt is guided about the clamping and deflecting rolls in such a manner that it forms a somewhat more than semicircular loop extending into the space between the clamping and deflecting rolls and serving for receiving the workpiece. The side of the polygon from which the loop extends has a cutting tool having one or more parallel cutting blades and is displaceable in the direction towards the workpiece to be clamped in the loop.

Preferably, three clamping and deflecting rolls, one of which is connected with a drive, are arranged in the form of a triangle.

It is an object of the present invention to provide a novel apparatus and method for cutting tubular workpieces into rings in a manner which is simple, reliable, and easier than those proposed heretofore.

For the purpose of illustrating the invention, there is shown in the drawings a form which is presently preferred; it being understood, however, that this invention is not limited to the precise arrangements and instrumentalities shown.

The invention is discussed in greater detail hereinbelow, with reference to the accompanying drawing. In the drawing, only the essential parts of a preferred embodiment of the device designed in accordance with the features of the invention, and the arrangement thereof one to another, are shown. All parts which are not necessary for understanding the invention have been omitted; these elements may be designed in conventional ways and also be conventionally arranged. The drawing shows also the main steps of the process according to the invention.

A plurality of clamping and deflecting rolls is secured to a suitable frame (not shown) in such manner that they are located at the corners of a polygon. In the preferred embodiment illustrated, three such securing and deflecting rolls 1, 2 and 3 are arranged at the corners of an imaginary triangle. It is also possible to provide some other number of deflecting rolls which are then arranged at the angles or corners of a corresponding polygon. In every case, however, the arrangement is such that there is provided between the deflecting rolls a space which is adequate to receive the largest workpieces likely to be dealt with.

At least one of the clamping and deflecting rolls is designed as a drive roll and is, for this purpose, connected to a drive device such as motor 10. In the case of the example of embodiment shown in the drawing, the motor 10 is connected to the roll 1. Furthermore, at least one of the clamping and deflecting rolls (in this case the roll 1) is so adjustable in respect of its spacing relatively to the adjacent roll that workpieces 4 having any of the diameters to be expected may be introduced between the said rolls into the inner space of the polygon (here a triangle) defined by the rolls.

Guided about the clamping and deflecting rolls is an endless belt 5, in such manner that it forms a somewhat more than semicircular loop 6 extending into the space between the securing and deflecting rolls. The said loop 6 serves for receiving the workpiece 4. The length of the endless belt is so calculated that, in combination with the adjustability of the one or more clamping and deflecting rolls, it enables workpieces 4 of varying diameter to be inserted in the loop 6. By appropriate selection of the belt length and the roll adjustability, a comparatively wide range may be achieved in respect of the diameters of the workpieces 4 to be machined.

As can be seen from the drawing, the workpiece 4 is, after insertion in the loop 6 of the endless belt 5 and tensioning of the belt by appropriate adjustment of the rolls 1 and 3 in the direction of the arrows D and E, firmly clamped between the loop 6 of the endless belt and the rolls 1 and 2. Note that the distance between points X and Y is less than the diameter of workpiece 4. Rolls 1 and 2 provide for the radial support and guiding of the workpiece or workpieces 4. For axial guiding, it is merely necessary to provide two round discs, the diameter of which is somewhat smaller than the diameter of the workpiece 4 and which are either stationary or rotate with the workpiece without, at the same time, exerting an axial pressure on the workpiece or the stack of workpieces. Rotation of the drive roll 1 in the direction of the arrow produces a rotation of the workpiece 4 in the direction of the arrow C.

The endless belt 5 may be a band, a strap, a chain or the like. It is merely necessary that the belt 5 should be sufficiently strong, so that the workpiece 4 inserted in the loop 6 is not able to deflect rearwardly during the cutting process and adequate pressure against the cutting edge of the cutting tool is assured. For simultaneous cutting into pieces of a plurality of workpieces arranged in a stack, it is possible to arrange a single correspondingly wide belt or a multiplicity of juxtaposed endless belts.

The clamping and deflecting rolls do not necessarily require to have the same diameter and it is clear that the dimensional relationship shown in the drawings constitutes merely an example.

A cutting tool 7 is disposed generally opposite that side of the polygon formed by the clamping and deflecting rolls from which the loop 6 extends. The tool 7 has, in the form of embodiment illustrated, one or more circular sawblades 8 on shaft 9.

The cutting tool 7 is so arranged that its cutting edge or edges "dip", when a feed is effected, into the interior of the hollow workpiece 4 as shown in the drawing. Optionally, the cutting tool could also be stationary and the structural unit comprising the deflecting and clamping rolls and the endless belt could be displaceably arranged, so that this unit may be fed towards the cutting tool.

For carrying into effect of the cutting process, first of all the workpiece 4 or the stack of workpieces is, with appropriate opening of the inlet between the clamping and deflecting rolls 1 and 2, inserted in the loop 6 of the endless belt 5. Then, the endless belt 5 is tensioned by adjusting the rolls 1 and 3 in the direction of the arrows D and E utilizing conventional adjusting devices 12 and 14. The belt 5 then bears firmly against that portion of the outer periphery of the workpiece or stack of workpieces which is remote from the zone of engagement of the cutting tool, i.e., the opening between the securing and deflecting rolls 1 and 2. Then, the cutting tool 7, which may have been positioned approximately in the position indicated on the left-hand side in the drawings, is advanced substantially until a cutting edge bears against the workpiece. This movement may take place rapidly. The cutting process proper then commences.

The cut is effected due to the cooperation of three movements, i.e., (1) the rotation of the tool 7, (2) rotation of the workpiece 4 (feed movement), and (3) a translatory movement one relative to the other of the workpiece and the cutting tool may take place sequentially (as shown in the drawing) or it may take place simultaneously. In the former case, the workpiece clamped in the loop of the endless belt is first of all held fast and the cutting tool is slowly, depending on the material properties of the workpiece and the properties of the cutting tool, i.e., therefore depending on the desired or achievable cutting speed, fed forwardly until the cutting edge of the tool has penetrated into the inner space of the workpiece. Then, the workpiece is slowly rotated, in proportion with the cutting capacity, by means of the endless belt, i.e., the cutting point in the workpiece is continuously advanced, slowly, towards the cutting edge, until the entire periphery of the workpiece has been travelled over. Thus, with this embodiment, a relatively rapid plunging movement is followed by a relatively slow rotation of the workpiece. After the said plunge cut, i.e., after the advance by, for example, the distance B, the cutting tool is then advanced no farther.

In the other embodiment, the workpiece 4 clamped in the loop 6 of the endless belt 5 is rapidly rotated by means of the belt and the cutting tool is advanced slowly, in accordance with the cutting capacity, towards the workpiece, so that the cutting edge of blade 8 engages tangentially and the workpiece is simultaneously cut over its entire periphery. No plunging of the cutting edge into the interior space of the workpiece takes place before the cutting step has practically been completed.

These various possible ways of carrying the cutting process into effect permit good adaptation to the conditions existing in every specific case in respect of material properties, the cutting tool used, etc. It is clear that the cutting tool may rotate either clockwise or anticlockwise.

It is also clear that the process and device according to the invention may be used also for the cutting into pieces of workpieces which are not of accurately round shape. For example, workpieces exhibiting a certain undesired deviation from a circular shape resulting from moulding inaccuracy in castings, or which exhibit an intentional deviation from the circular shape, for example the "apple" shape in a piston ring may be cut.

Due to the process and device according to the invention, the disadvantages described at the outset of the known processes and devices, and in particular all shortcomings resulting from the use of a rubber member for internal clamping, and sources of error due to the use of a multiplicity of mechanically or hydraulically actuated claws, are obviated. The process and device according to the invention require only a small operational and apparative expenditure, they result in the production of entirely satisfactory products and they have been found to be very reliable in operation.

The present invention may be embodied in other specific forms without departing from the spirit or essential attributes thereof and, accordingly, reference should be made to the appended claims, rather than to the foregoing specification as indicating the scope of the invention.

I claim:

1. Process for the radial cutting into pieces of annular or sleeve-shaped workpieces, such as piston ring or cylinder liner blanks comprising clamping a workpiece, employing a relative movement between the workpiece and a cutting tool, cutting the workpiece in a radial direction at right angles to the axis of rotation of the tool, characterized by using slightly more than a semicircular loop of an endless member firmly tensioned against that portion of the outer periphery of the workpiece which is remote from the zone of engagement of the cutting tool, and causing the workpiece by means of the endless member to be pressed with the desired force against the cutting tool and also rotated about its longitudinal axis.

2. Process according to claim 1 including slowly feeding the cutting tool forwardly, in proportion with the cutting capacity, until the cutting edge thereof has penetrated into the inner space of the workpiece, and then slowly rotating the workpiece in proportion with the cutting capacity, by means of the endless member, whereby the cutting point in the workpiece is advanced towards the cutting edge.

3. Process according to claim 1 including rapidly rotating the workpiece by means of the endless belt during the cutting step.

4. Process according to claim 1 including positioning the loop so that it is open on its bottom side, offsetting gravity on the workpiece by positioning two of said rolls.

5. Cutting apparatus comprising a multiplicity of clamping and deflecting rolls, at least one of which is connected with a drive and at least one of which is adjustable relative to the adjacent rolls to a spacing within the range of the diameters of the workpieces to be cut up, said rolls being arranged in the form of a polygon, an endless belt guided about the rolls and having a loop greater than 180° for receiving the workpiece, and a cutting tool having at least one blade for displacement in a direction towards the workpiece to be clamped in the loop.

6. Apparatus according to claim 5 wherein three clamping and deflecting rolls are provided and arranged in the form of a triangle, two of said rolls cooperating with said belt to retain the workpiece in position.

7. Apparatus in accordance with claim 6 wherein said loop is open on its lower side, and said two rolls offsetting the effect of gravity on said workpiece.